March 15, 1955     B. L. BAXTER     2,703,978
APPARATUS FOR TESTING WELDED TUBING SEAMS
Filed Feb. 29, 1952     3 Sheets-Sheet 1
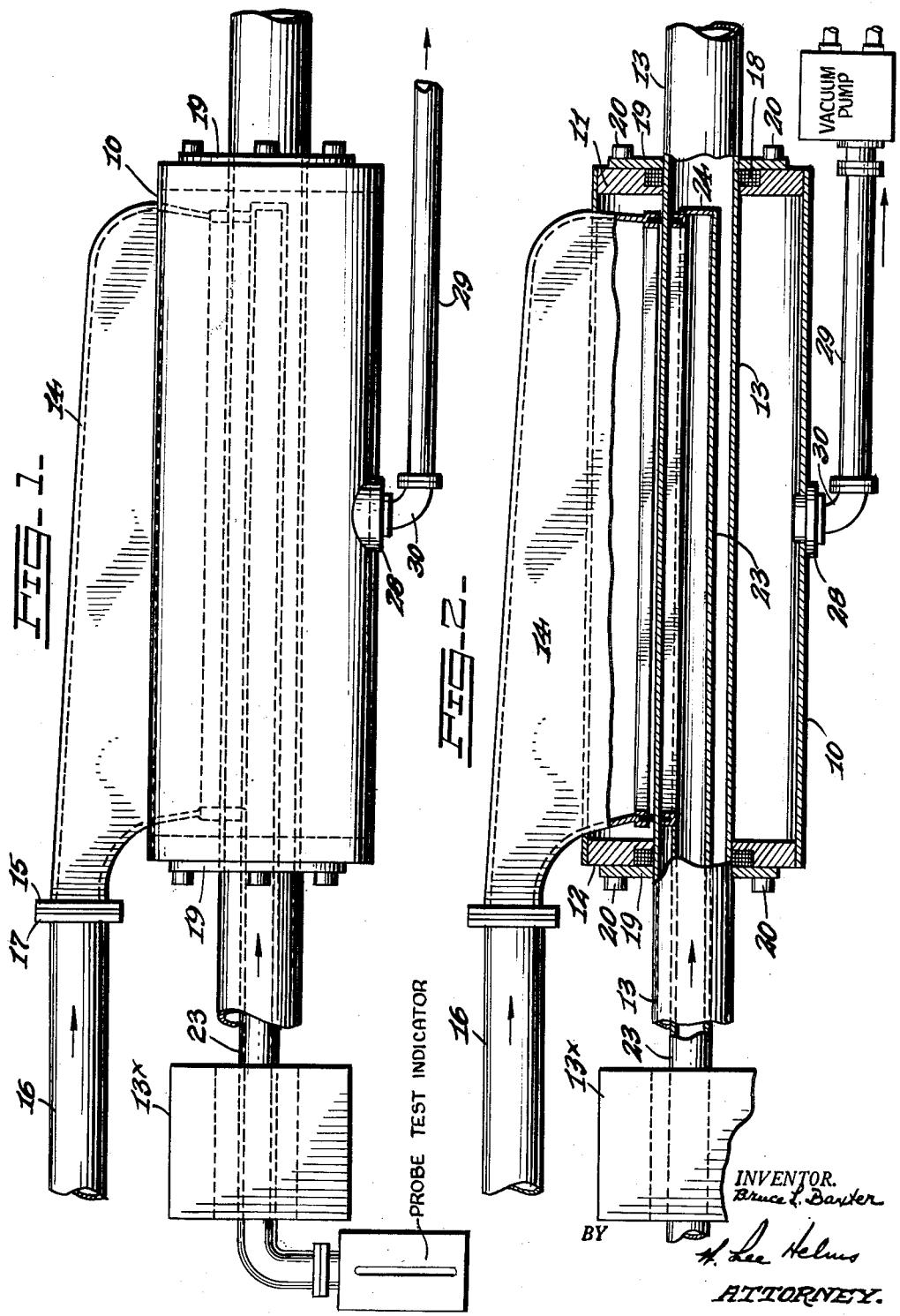

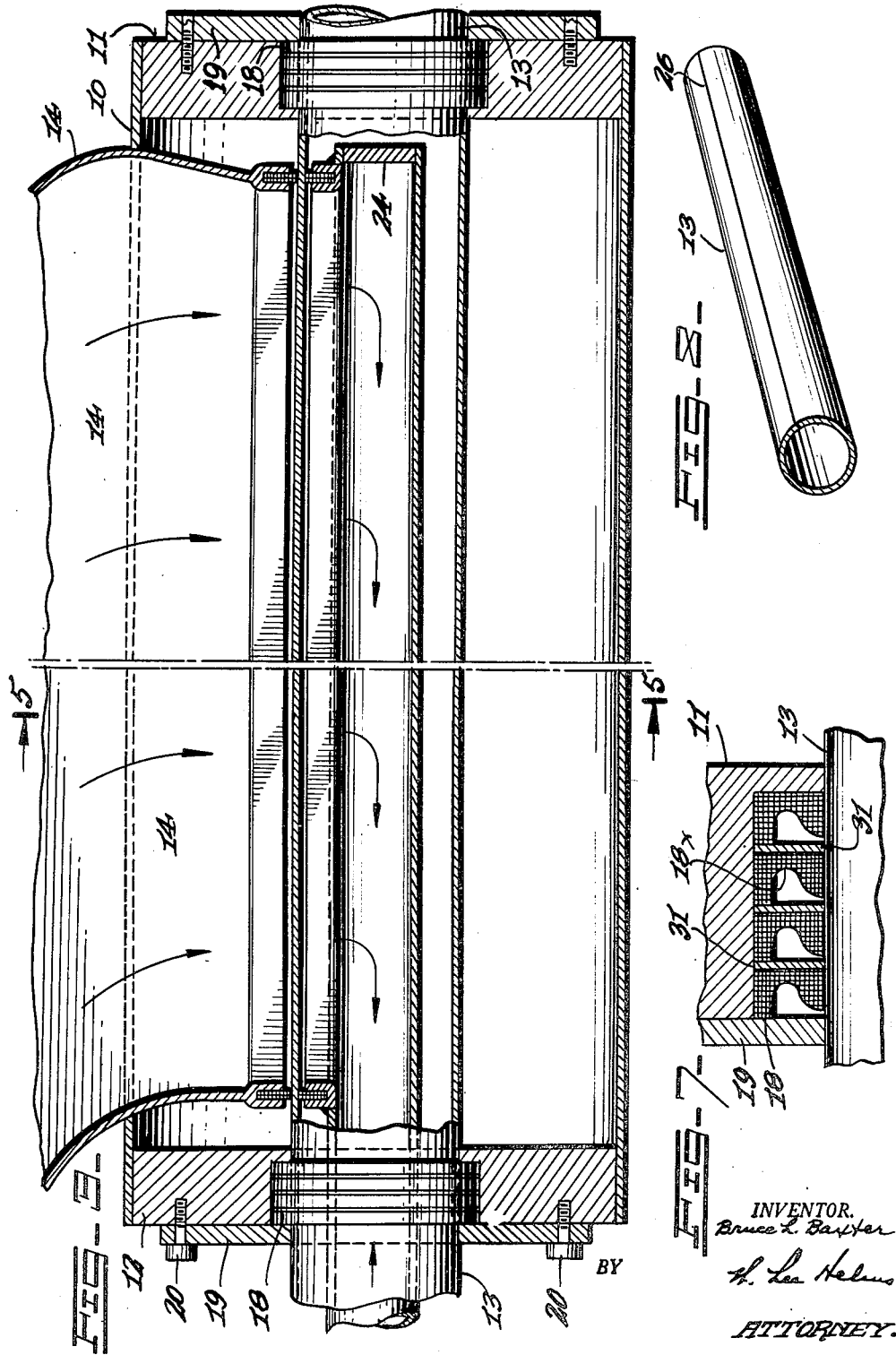

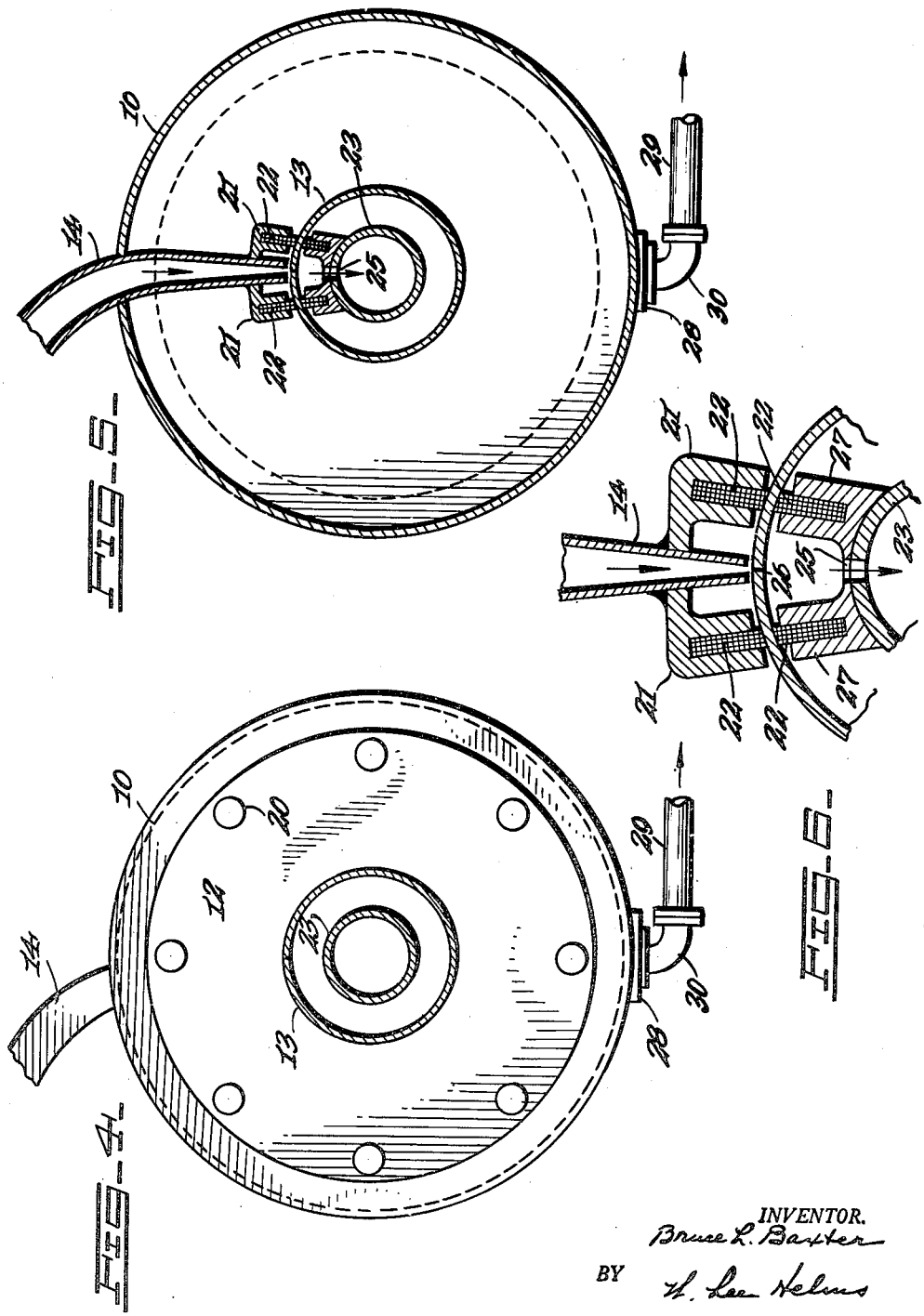

United States Patent Office 2,703,978
Patented Mar. 15, 1955

2,703,978
APPARATUS FOR TESTING WELDED TUBING SEAMS

Bruce L. Baxter, Louisville, Ky., assignor to Reynolds Metals Company, Richmond, Va., a corporation of Delaware Application February 29, 1952, Serial No. 274,194

2 Claims. (Cl. 73—40)

This invention relates to a gas tester and more particularly to a gas tester for testing seamless welded tubing.

Tubing made by welding is done by a continuous process. However, the welded joint or seam may have defects, such as pin holes, permitting the flow of a gas or fluid therethrough.

Since such tubing, especially when made from corrosion resistant aluminum and the like, may be used to convey fluid chemicals and other liquids or gases, it is clear that the detection of even minute pin holes in the weld seam is very important.

It is an object of this invention to provide a gas tester adapted to test continuously moving seamless welded tubing.

It is another object of this invention to test for pin holes in welded seams of tubing by applying a test gas under pressure to said seams.

It is a further object of this invention to provide an efficient weld seam tubing tester adapted for rapidly and economically testing moving tubing.

These and other objects will become apparent upon reading the following detailed disclosure taken in conjunction with the accompanying drawing in which, Fig. 1 is a longitudinal elevation view of the gas tester, Fig. 2 is a longitudinal sectional view similar to Fig. 1 and broken away in part, Fig. 3 is a detailed longitudinal section broken away in part through the tubing and showing the path of flow of test gas, Fig. 4 is an end view of the apparatus showing the welded tubing in cross-section.

Fig. 5 is a transverse view taken on line 5—5 of Fig. 3,

Fig. 6 is a detailed view of the gas jet adjacent the sealed seam,

Fig. 7 is a transverse section of the seals used about the tubing to prevent gas leaks and, Fig. 8 is a perspective view of a length of seamless welded tubing.

Referring to Fig. 1, a casing 10, provided with circular end plates 11 and 12, is provided for receiving seamless tubing such as indicated at 13. The casing 10 has a slot cut therein at its top for a longitudinal jet nozzle 14. The jet nozzle 14 terminates in a circular gas inlet opening having a flange 15 thereon. A high pressure gas inlet pipe 16 having a flange 17 thereon is secured by said flange 17 to flange 15 of the jet nozzle 14. A plurality of suitable circular seals 18 made of such material as rubber, plastic, and the like is disposed in a recess provided therefor in circular end plates 11 and 12. Thrust plates 19 are disposed about the tubing and secured by a plurality of bolts 20 to said end plates 11 and 12.

The longitudinal jet nozzle 14 carries a circumferentially disposed depending lug 21, having a channel therein for a continuous strip of seal material 22. An exhaust tube 23 is provided, said exhaust tube 23 having an end plate 24. Exhaust tube 23 has a longitudinal slot 25 (Fig. 5) disposed beneath nozzle 14. Moreover, slot 25 will also be disposed beneath the seamless weld joint 26 of a welded seam tube to be tested. On both sides of slot 25 and secured to exhaust tube 23 are disposed a vertical or upright circumferential lug 27, which completely surround slot 25. The lug 27 has a channel therein adapted to hold a continuous strip of sealing material 22. Sealing material 22 is secured in such a manner that a gas-tight seal is formed between the tube 13 to be tested and all contacting surfaces of seal 22 disposed above or below the walls of said tube 13.

In the operation of this gas tester a gas of suitable testing characteristics such as helium or the like is forced under pressure through tube 16 and jet nozzle 14 against the welded seam of a tube 13 coming from the welding unit 13x. The path of the test gas is shown by the direction of the arrows in Figs. 3, 5 and 6. If a pin-hole is present in the welded seam under test, some of the high pressure test gas will pas through the pin hole and through slot 25 into exhaust tube 23 from where it may be conducted to some type of electronic detector of commercially conventional design. The electronic leak detector may be adapted to actuate a suitable marker, chart, or other permanent recording device.

The chamber space between casing wall 10 and the tube 13 under test is exhausted to create a vacuum. For this purpose an orifice is located in the bottom of cylinder 10 and a flanged outlet 28 is secured to said orifice. Vacuum exhaust pipe 29 is secured through an elbow 30 to outlet orifice 28. When a vacuum is maintained in the chamber space between cylinder 10 and welded tube 13 any loss of test gas past seals 22 into the vacuum space will be conducted through the vacuum conduit 29 to a suitable electronic tester.

To prevent loss of high pressure gas to the outside atmosphere around ends 11 and 12, a plurality of circular seals 18, as shown in Fig. 7, are provided so as to maintain a sliding frictional contact with the welded tube 13. While the circular seal shown in Fig. 7 has curved recesses 18x therein, thereby providing a better seal when under compression, such curved recesses are not essential, since an effective seal against high pressure may be maintained by ordinary seals having square or rectangular cross-section. A plurality of spacers 31, in the shape of washers, may be disposed among the individual circular seals 18.

This invention has been described with an illustrative embodiment, but clearly its scope is larger, since non-inventive modifications will become readily apparent to those skilled in the art after reading this disclosure. All such modifications are intended to be embraced within the scope of the claims herein.

Having described my invention, what I claim and desire to secure by Letters Patent, is as follows:

1. A tester using probe gas under pressure for continuously testing weld seams in continuously moving tubing comprising an inlet nozzle deposed over said seam for applying high pressure gas, an exhaust conduit having a longitudinal slot adapted to be disposed within said tubing with said slot being disposed beneath said seam, sealing means surrounding the nozzle and frictionally engaging said tubing to seal off the high pressure gas directed through said nozzle, sealing means surrounding the exhaust slot for frictionally engaging said exhaust conduit and said tubing in gas tight relationship, and means disposed in said exhaust conduit for indicating the presence of probe gas.

2. A probe gas tester for testing welded seams of moving seam welded pipe with a probe gas under pressure, comprising an elongated nozzle having a channel containing a lug disposed about said nozzle and adapted to be disposed over a length of seam weld of a welded seam pipe, an exhaust tube having an elongated slot adjacent one end and having a channel-containing lug disposed about said slot adapted to be disposed over a length of seam weld disposed within said exhaust tube and below said nozzle, a casing surrounding the exhaust tube and closed except for openings receiving the nozzle and said tube to be tested, sealing means frictionally disposed in channels of both of said lugs of the exhaust tube and nozzle for effecting a gas-tight relationship between said sealing means and a welded seam pipe, and means for exhausting said casing to create a vacuum therein.

References Cited in the file of this patent

UNITED STATES PATENTS

| | | |
|---|---|---|
| 2,244,864 | Witham | June 10, 1941 |
| 2,264,515 | Fear | Dec. 2, 1941 |
| 2,486,199 | Nier | Oct. 25, 1949 |
| 2,552,189 | Kuehni | May 8, 1951 |
| 2,573,646 | Koestering | Oct. 30, 1951 |
| 2,587,192 | Meyer | Feb. 26, 1952 |